United States Patent [19]

Rosenblad

[11] Patent Number: 4,764,254
[45] Date of Patent: Aug. 16, 1988

[54] FALLING FILM LIQUOR HEATER HAVING A SCREEN TO PREVENT CLOGGING OF A LIQUID DISTRIBUTING TRAY

[75] Inventor: Axel E. Rosenblad, Seabright, N.J.

[73] Assignee: Rosenblad Corporation, Princeton, N.J.

[21] Appl. No.: 52,398

[22] Filed: May 21, 1987

[51] Int. Cl.⁴ .................. D21C 7/10; F28F 19/00
[52] U.S. Cl. .................. 162/249; 162/250; 162/251; 159/13.3; 159/28.6; 159/42; 159/43.1; 165/119; 210/181; 210/184
[58] Field of Search .................. 159/13.3, 42, 43.1, 159/28.6; 162/250, 249, 251, 233; 202/178; 210/181, 184; 165/119

[56] References Cited

U.S. PATENT DOCUMENTS

| 258,062 | 5/1882 | Henthorn | 159/42 |
| 470,060 | 3/1892 | Lillie | 159/43.1 |
| 3,057,786 | 10/1962 | Waddil | 159/43.1 |
| 3,597,329 | 8/1971 | Brown | 159/28.6 |

FOREIGN PATENT DOCUMENTS 3419172 9/1985 Fed. Rep. of Germany ..... 159/13.3

Primary Examiner—Steve Alvo
Attorney, Agent, or Firm—Brooks Haidt Haffner & Delahunty

[57] ABSTRACT

In a falling film exchanger, a screen arrangement for preventing solid particles in the liquid to be heated from plugging liquid distribution outlets of a perforated liquid distributing tray or reaching the heating surface of the heat exchanger.

8 Claims, 1 Drawing Sheet

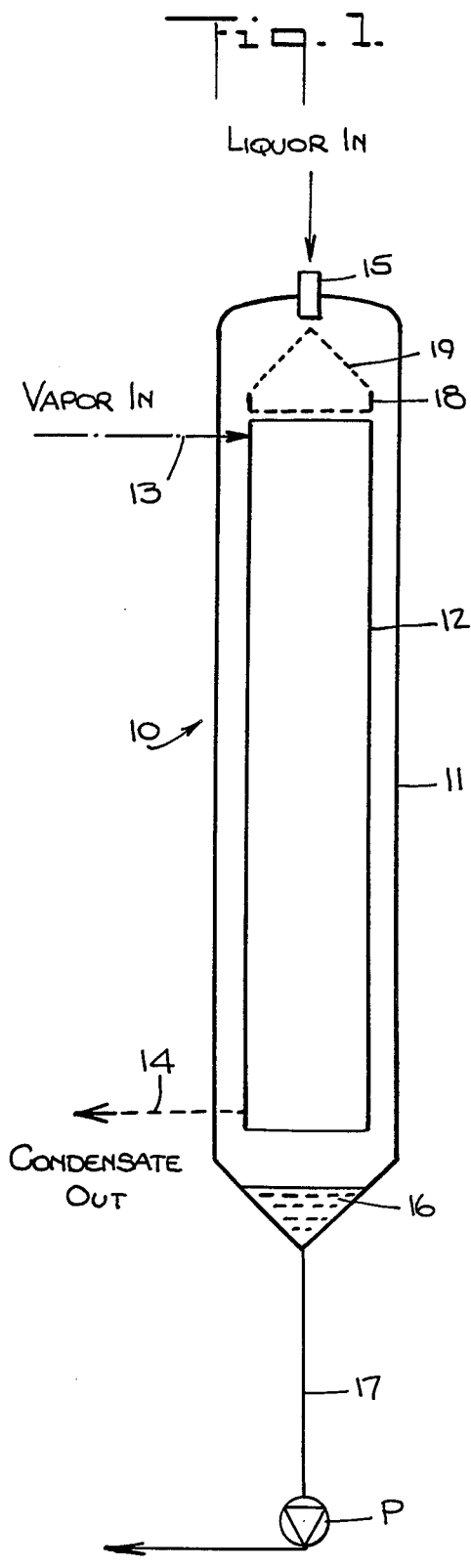
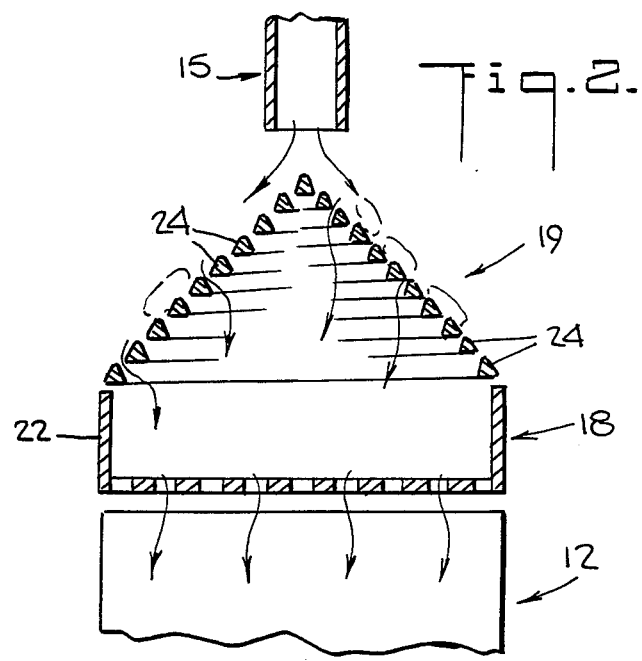
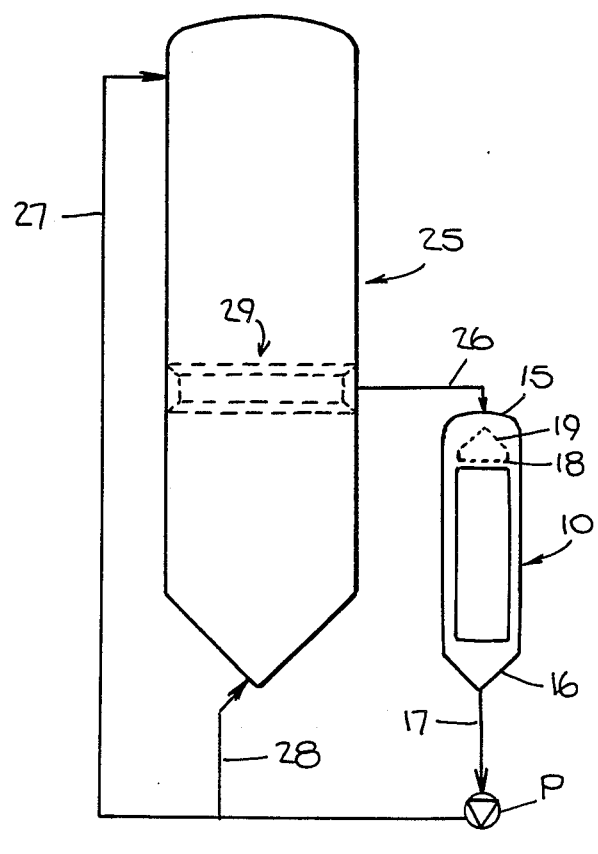

FALLING FILM LIQUOR HEATER HAVING A SCREEN TO PREVENT CLOGGING OF A LIQUID DISTRIBUTING TRAY

BACKGROUND OF THE INVENTION

1. Field of the Invention

The present invention relates to the heating of liquids in a falling film heat exchanger, and more particularly to a screen arrangement for preventing solid particles in the liquid to be heated from plugging liquid distribution outlets of a perforated liquid distributing tray or reaching the heating surface of the heat exchanger.

2. Description of the Prior Art

Falling film plate type heat exchangers have a wide variety of industrial uses. Such falling film heat exchangers are shown and described in U.S. Pat. Nos. 3,332,469; 3,307,614 and 3,366,158. In such heat exchangers liquid to be heated by indirect heat exchange with vapor is directed to flow as a falling film down the external surfaces of two-plate heating elements to be heated by heat exchange with vapor circulating between the plates of those elements. One common arrangement for distributing the liquid so that the liquid flows evenly down the plate surfaces comprises a perforated horizontally disposed tray located above the tops of the plate heat exchange elements. Holes in the tray are arranged above the top edges of the plate elements.

The holes of such a perforated tray can become plugged or obstructed if the liquid to be heated carries large solid particles in suspension. For example, when a falling film type plate heat exchanger is used as an external heater for a batch digester in the wood pulping industry, wood particles entrained in the liquor can clog the holes of the heat exchanger's liquid distribution tray and thereby interfere with the even distribution of liquor to the plate elements.

The present invention provides a solution to the problem of the plugging of holes in liquid distribution trays and the like. Undesirable particles are diverted to bypass the tray and the heating surface.

SUMMARY OF THE INVENTION

In accordance with the present invention, a sloping screen having openings that are smaller than the perforations of a liquid distribution tray is installed above the tray and below the inlet into the heat exchanger for liquid to be heated. Solid particles which otherwise could plug the holes of the liquid distribution tray cannot pass through the openings of the screen and so cannot reach the tray holes. Because the screen surface is at an angle to the horizontal, the screened-out particles will be washed down the screen's outer surface to bypass the plate heating surface and be pumped away from the heat exchanger.

Although the screen can be arranged in various ways, as can the means for feeding liquid to the screen, a presently preferred embodiment of the invention employs a generally conical screen with its apex centered below the point at which liquid is fed to the screen. A screen in the form of a right circular cone with its surface sloping at an angle of about 60 degrees effectively deflects solid particles. The screen could also have the shape of a pyramid with its base corresponding to the perimeter of the liquid distribution tray, or some other shape providing sloping sides.

It is presently preferred to form the screen from a coil of wire, for example, wire which is triangular in cross section with the angles somewhat rounded rather than sharp. In such an embodiment the openings through the screen are the spaces between adjacent wire coils which constitute passages through the screen.

BRIEF DESCRIPTION OF THE DRAWINGS

In the accompanying drawing figures, in which like reference characters designate like parts throughout:

FIG. 1 shows a plate type falling film heat exchanger equipped with a screen in accordance with the invention;

FIG. 2 is a detail view in section of the screen shown in FIG. 1; and

FIG. 3 illustrates an application of the heat exchanger with its screen in conjunction with a batch digester of the type used in the wood pulping industry.

DETAILED DESCRIPTION OF A PREFERRED EMBODIMENT

As shown in FIG. 1, a plate type falling film heat exchanger generally designated by reference numeral 10 has an outer housing 11 within which an array of generally parallel vertical pairs of heat exchange plate elements 12 are housed. Each plate heat exchange element 12 is formed of a pair of plates joined together at the plate peripheries with an inlet for heating vapor shown by arrow 13 and an outlet for condensate as shown by arrow 14.

There is an inlet 15 for feeding liquid to be heated into the heat exchanger 10 at the top of the housing 11, and a space 16 at the bottom of the housing 11 for collecting heated liquid, whence the heated liquid exits via line 17 to be circulated by the pump P.

Liquid distribution tray 18 is shown as overlying the upper edges of the plate heat exchange elements 12 with holes or perforations aligned with the plate edges. The sloping screen 19 is located below the liquid inlet 15 and above the liquid distribution tray 18 to intercept solid particles which enter with the liquid to be heated before such particles can reach the distribution tray 18 and possibly plug the perforations thereof. Particles intercepted by the screen 19 pass down the sloping sides of the screen to be discharged with the heated liquid without passing over the surfaces of the plate elements 12.

The tray 18 and screen 19 are shown in greater detail in FIG. 2. The sizes of elements shown in FIG. 2 are exaggerated for purposes of illustration of the principles of the invention. As shown by the arrows in the figure, liquid to be heated enters through means 15, shown simply as a pipe, though the liquid feed system could have some other form, and passes to and through the screen 19 to be distributed to the heat exchange elements 12 by the liquid distribution tray 18. The tray 18 has a generally flat horizontal bottom 21 and upstanding side walls 22. A plurality of perforations 23 in the tray bottom 21 are arranged to distribute the liquid to be heated evenly over the width of the plate elements 12. The relative size of the perforations 23 is exaggerated for purposes of illustration, as is the size of openings 24 through the screen 19 which is illustrated as being directly above the tray 18. The screen 19 is large enough so that solid particles which are deflected by the screen 19 fall outside the side walls 22 of the tray 18. The overall configuration of the screen 19 can be conical or pyramidal with sides sloping at an angle to the horizontal, preferably about 60 degrees.

The screen 19 can be formed, as shown, of a coil of wire, the cross-section of which is in the shape of a triangle with rounded corners. Openings 24 through the screen are smaller than the perforations 23 of the distribution tray 21 so that no particles large enough to plug a perforation 23 can pass through the screen 19. A solid particle of exaggerated size is shown being intercepted by the screen 19 at the middle left of the illustration of FIG. 2.

The screen 19 effectively prevents any solid particles which enter the heat exchanger 10 along with the liquid to be heated from plugging the perforations 23 of the liquid distribution tray 18. Intercepted particles bypass the tray 18 and the heat exchange plate elements 12 and are discharged from the heat exchanger 10. The particles can be circulated along with the heated liquid leaving the heat exchanger 10 along with the heated liquid, or if desired, separated therefrom.

FIG. 3 shows an application of the invention in which the heat exchanger 10 is employed as an external heater for a digester of the type used in the wood pulping industry to cook wood chips. Cooking liquor is withdrawn from the digester generally indicated by reference numeral 25 through a pipe 26 to the inlet 15 of the heat exchanger 10. After being heated in the heat exchanger 10, the liquor is reintroduced into the digester 25 at the top through pipe 27 and also at the bottom of the digester through a pipe 28. Those acquainted with the pulping industry will appreciate that this is done for better circulation. The digester 25 is shown as equipped with the usual strainers at 29, which should prevent the passage of large solid particles out through the pipe 26, but since some particles will enter the line 26, the screen 19 serves to prevent the clogging of the liquor distribution tray by such particles, which then pass back to digester 25 via pipes 17, 27 and 28. The arrangement of FIG. 3 is merely illustrative of one application of the heater of the invention.

Numerous other applications as well as modifications in the parts, form and operation of the liquor heater of the invention will suggest themselves to those acquainted with the heat exchanger art, and such applications and modifications are considered to be within the spirit and scope of the invention, which pertains to a improved liquor heater.

What is claimed is:

1. In a falling film heat exchanger of the type having a heated surface for the indirect exchange of heat beetween a vapor and a liquid which flows as a falling film down said heating surface, and having a liquid distributor with openings for distributing liquid to be heated to the heating surface, a screen between a liquid inlet and said liquid distributor for preventing passage to the distributor of solid particles which could plug the openings of said liquid distributor said screen having sides which slope downwardly and outwardly from an apex positioned beneath said liquid inlet for deflecting such solid particles.

2. The apparatus of claim 1 in which said sloping screen is generally conical in form.

3. The apparatus of claim 1 in which said screen is formed of a coil of wire with passages between adjacent coils of said wire which are narrower than the openings of said liquid distributor.

4. The apparatus of claim 1 wherein said screen slopes at an angle of about 60 degrees from the horizontal.

5. A plate type falling film heat exchanger having a plurality of generally parallel vertical plate heat exchange elements and a liquid distributing tray with perforations arranged above tops of said plate heat exchange elements for providing an even distribution of liquid thereto, and a screen with downwardly and outwardly sloping sides with an apex positioned beneath and pointed toward an inlet for the liquid to prevent plugging of said perforations by screening out solid particles from liquid being fed to said distributing tray.

6. The heat exchanger of claim 5, wherein said sloping screen is conical in form.

7. The heat exchanger of claim 5 wherein said screen is formed of a coil of wire with passages between the wires of said coil which are smaller than the perforations of said liquid distributing tray.

8. The heat exchanger of claim 5 and including means for discharging solid particles along with heated liquid from the heat exchanger.

* * * * *